(12) United States Patent
Jaradi et al.

(10) Patent No.: US 12,115,928 B1
(45) Date of Patent: Oct. 15, 2024

(54) VEHICLE SENSOR ASSEMBLY

(71) Applicant: Ford Global Technologies, LLC, Dearborn, MI (US)

(72) Inventors: Dean M. Jaradi, Macomb, MI (US); Mohammad Omar Faruque, Ann Arbor, MI (US); S. M. Iskander Farooq, Novi, MI (US); Zhenyan Gao, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 18/335,429

(22) Filed: Jun. 15, 2023

(51) Int. Cl.
| | |
|---|---|
| *B60R 21/2338* | (2011.01) |
| *B60R 21/207* | (2006.01) |
| *B60R 21/01* | (2006.01) |
| *B60R 21/231* | (2011.01) |

(52) U.S. Cl.
CPC ........ *B60R 21/2338* (2013.01); *B60R 21/207* (2013.01); *B60R 2021/01027* (2013.01); *B60R 2021/23107* (2013.01)

(58) Field of Classification Search
CPC ...... B60R 21/2338; B60R 2021/23388; B60R 21/207; B60R 2021/01027; B60R 2021/23107; B60R 2021/23146; B60R 21/18
See application file for complete search history.

(56) References Cited

U.S. PATENT DOCUMENTS

| | | | |
|---|---|---|---|
| 10,946,826 B2 | 3/2021 | Jaradi et al. | |
| 11,040,691 B2* | 6/2021 | Faruque | B60R 21/2338 |
| 11,529,923 B2* | 12/2022 | Jaradi | B60R 21/231 |
| 11,618,404 B1* | 4/2023 | Jaradi | B60R 21/23138 |
| | | | 280/730.1 |
| 11,951,927 B1* | 4/2024 | Faruque | B60R 21/233 |
| 2009/0322067 A1* | 12/2009 | Nezaki | B60R 22/26 |
| | | | 297/474 |
| 2018/0222432 A1* | 8/2018 | Schneider | B60R 21/262 |
| 2019/0016293 A1* | 1/2019 | Saso | B60R 21/23138 |
| 2019/0071046 A1* | 3/2019 | Dry | B60R 21/233 |
| 2020/0254953 A1* | 8/2020 | Jessup | B60R 22/26 |

(Continued)

FOREIGN PATENT DOCUMENTS

| | | | | | |
|---|---|---|---|---|---|
| CN | 109421648 A | * | 3/2019 | ............. | B60N 2/14 |
| CN | 213262308 U | * | 5/2021 | ........... | B60R 21/207 |

(Continued)

*Primary Examiner* — Amy R Weisberg
*Assistant Examiner* — Matthew D Lee
(74) *Attorney, Agent, or Firm* — Frank A. MacKenzie; Bejin Bieneman PLC (57) ABSTRACT

An assembly includes a seat bottom and a seatback supported by the seat bottom, the seatback having a top end. The assembly includes a first airbag and a second airbag, each inflatable to an inflated position and supported by the seatback at the top end. The assembly includes a lap belt extending from the first airbag to the second airbag. The assembly includes a first retractor and a second retractor, both supported by the seat bottom and spaced from the seatback. The second retractor is spaced from the first retractor along the lateral axis. The assembly includes a first tether extending from the first retractor and fixed to the lap belt, and a second tether extending from the second retractor and fixed to the lap belt.

20 Claims, 5 Drawing Sheets

(56) References Cited

U.S. PATENT DOCUMENTS

2021/0009067 A1\* 1/2021 Kadam ................ B60R 21/239
2024/0025370 A1\* 1/2024 Faruque ............. B60R 21/2338

FOREIGN PATENT DOCUMENTS

| CN | 117885679 A | \* | 4/2024 | ........... B60R 21/207 |
| DE | 102014004186 A1 | \* | 9/2015 | ............ B60R 21/08 |
| FR | 2741572 A1 | | 5/1997 | |

\* cited by examiner

VEHICLE SENSOR ASSEMBLY

BACKGROUND

A vehicle may include one or more airbags deployable during certain vehicle impacts to control kinematics of occupants inside the vehicle during the impact. The airbag may be a component of an airbag assembly including a housing supporting the airbag, and an inflation device in communication with the airbag for inflating the airbag from an uninflated position to an inflated position.

DETAILED DESCRIPTION

An assembly includes a seat bottom. The assembly includes a seatback supported by the seat bottom, the seatback having a top end. The assembly includes a first airbag inflatable to an inflated position and supported by the seatback at the top end. The assembly includes a second airbag inflatable to an inflated position supported by the seatback at the top end, the second airbag spaced from the first airbag along a lateral axis of the seatback. The assembly includes a lap belt extending from the first airbag to the second airbag. The assembly includes a first retractor supported by the seat bottom and spaced from the seatback. The assembly includes a first tether extending from the first retractor and fixed to the lap belt. The assembly includes a second retractor supported by the seat bottom and spaced from the seatback, the second retractor spaced from the first retractor along the lateral axis. The assembly includes a second tether extending from the second retractor and fixed to the lap belt.

The first retractor and the second retractor may be seat-forward of the seatback.

The assembly may include a first chute and a second chute supported by the seat back and pointed upward and forward to direct inflation of the first airbag and the second airbag.

The first chute and the second chute may each have an open end that faces upward and forward.

The assembly may include a chest panel supported above the lap belt by the first airbag and the second airbag in the inflated positions.

The chest panel may be inflatable.

The chest panel may include a top edge positioned to be below a head of an occupant seated on the seat bottom with the first airbag and the second airbag in the inflated positions.

The assembly may include a first chest tether extending from the first airbag to the chest panel and a second chest tether extending from the second airbag to the chest panel.

The first retractor and the second retractor may be actuatable to retract the first tether and the second tether.

The assembly may include a computer having a processor and a memory storing instructions executable by the processor to command inflation of the first airbag and the second airbag, and command actuation of the first retractor and the second retractor.

The instructions may include instructions to command actuation of the first retractor and the second retractor a predetermined amount of time after commanding inflation of the first airbag and the second airbag.

An assembly includes a seat bottom having a front end and a rear end. The assembly includes a seatback supported by the seat bottom at the rear end, the seatback having a top end spaced from the seat bottom. The assembly includes a first chute supported by the seatback at the top end. The assembly includes a first airbag supported by the first chute and inflatable an inflated position, the first chute pointed seat-upward and seat-forward to direct inflation of the first airbag. The assembly includes a second chute supported by the seatback at the top end, the second chute spaced from the first chute along a lateral axis of the seatback. The assembly includes a second airbag supported by the second chute and inflatable to an inflated position, the second chute pointed seat-upward and seat-forward to direct inflation of the second airbag. The assembly includes a lap belt extending from the first airbag to the second airbag. The assembly includes a first retractor. The assembly includes a first tether extending from the first retractor and fixed to the lap belt. The assembly includes a second retractor spaced from the first retractor along the lateral axis. The assembly includes a second tether extending from the second retractor and fixed to the lap belt.

The first chute and the second chute may each be elongated between first ends and second ends, the first ends forward and above the second ends.

The first ends of the first chute and the second chute may be open.\

The assembly may include a chest panel supported above the lap belt by the first airbag and the second airbag in the inflated positions.

The chest panel may be inflatable.

The chest panel may include a top edge positioned to be below a head of an occupant seated on the seat bottom with the first airbag and the second airbag in the inflated positions.

The first retractor and the second retractor may be actuatable to retract the first tether and the second tether.

The assembly may include a computer having a processor and a memory storing instructions executable by the processor to command inflation of the first airbag and the second airbag, and command actuation of the first retractor and the second retractor.

The instructions may include instructions to command actuation of the first retractor and the second retractor a predetermined amount of time after commanding inflation of the first airbag and the second airbag.

With reference to the Figures, wherein like numerals indicate like parts throughout the several views, a vehicle 20 with a seat assembly 22 is shown. The seat assembly 22 includes a seat bottom 24. The seat assembly 22 includes a seatback 26 supported by the seat bottom 24, the seatback 26 having a top end 28. The seat assembly 22 includes a first airbag 30 inflatable to an inflated position and supported by the seatback 26 at the top end 28. The seat assembly 22 includes a second airbag 32 inflatable to an inflated position and supported by the seatback 26 at the top end 28. The second airbag 32 is spaced from the first airbag 30 along a lateral axis A1 of the seatback 26. The seat assembly 22 includes a lap belt 34 extending from the first airbag 30 to the second airbag 32. The seat assembly 22 includes a first retractor 36 supported by the seat bottom 24 and spaced from the seatback 26. The seat assembly 22 includes a first tether 38 extending from the first retractor 36 and fixed to the lap belt 34. The seat assembly 22 includes a second retractor 40 supported by the seat bottom 24 and spaced from the seatback 26. The second retractor 40 is spaced from the first retractor 36 along the lateral axis A1. The seat assembly 22 includes a second tether 42 extending from the second retractor 40 and fixed to the lap belt 34.

Figure 1:
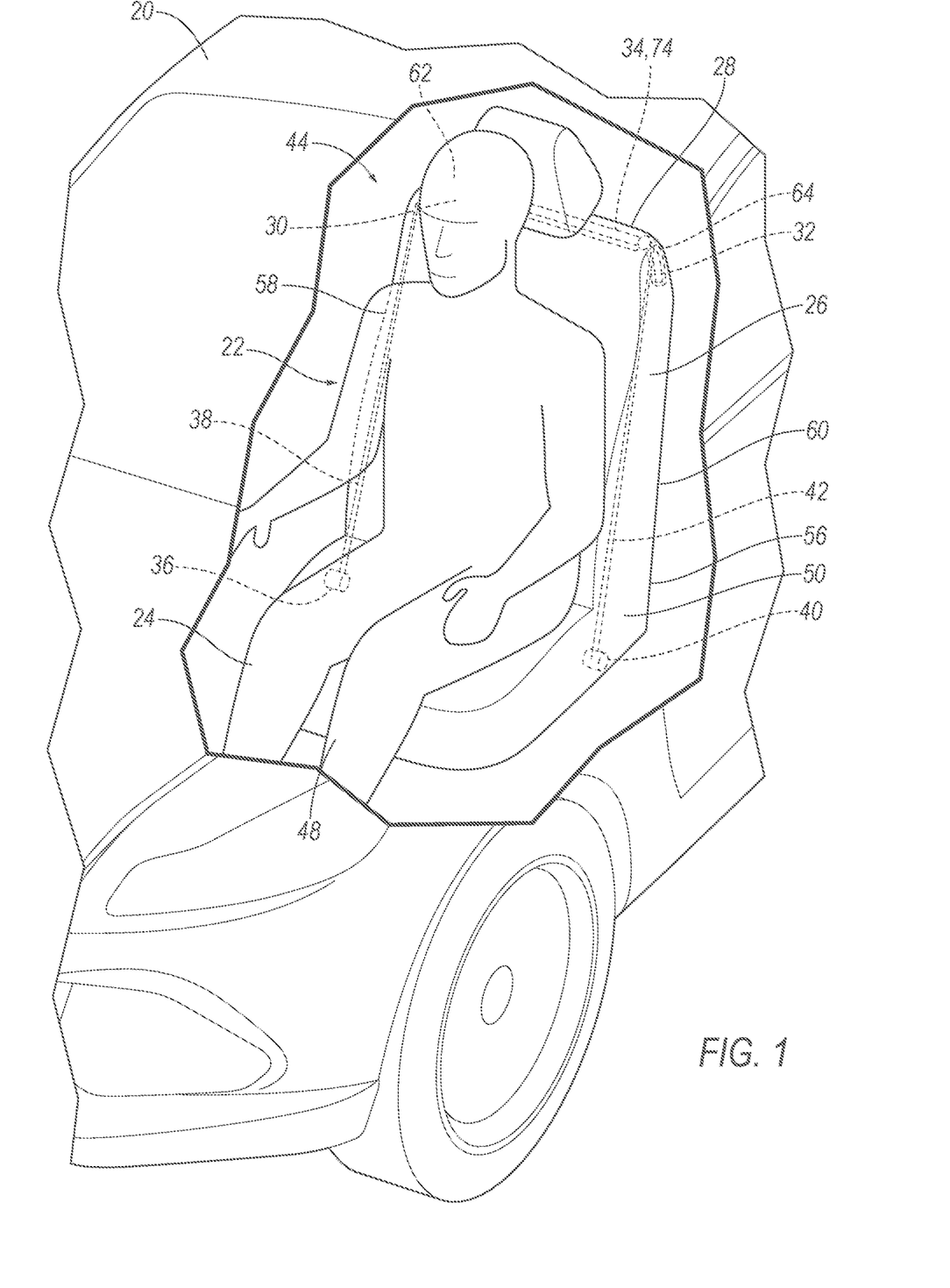
FIG. 1 is a perspective view a portion of a vehicle with a seat assembly.

With reference to FIG. 1, the vehicle 20 may be any suitable type of automobile, e.g., a passenger or commercial automobile such as a sedan, a coupe, a truck, a sport utility vehicle, a crossover vehicle, a van, a minivan, a taxi, a bus, etc.

The vehicle 20 may define a passenger cabin 44 to house occupants, if any, of the vehicle 20. The passenger cabin 44 may extend across the vehicle 20, e.g., from a left side of the vehicle 20 to a right side of the vehicle 20. The passenger cabin 44 includes a front end and a rear end with the front end being in front of the rear end during forward movement of the vehicle 20.

One or more seat assemblies 22 may be supported in the passenger cabin 44, e.g., by a floor of the vehicle 20. It is anticipated that technology and the regulatory framework may evolve in the future to where use of rotatable seat assemblies becomes safe and permissible and, under such circumstances, the seat assemblies 22 may be rotatably supported by the floor to rotate and face, e.g., the front end, the rear end, the right side, the left side, etc., of the passenger cabin 44. The seat assemblies 22 may be supported via a pivot assembly or other suitable structure that allows rotation of the seat assembly 22, including conventional structures. Each seat assembly 22 includes the seatback 26 and the seat bottom 24 that can support an occupant of the seat assembly 22. For example, the occupant of the seat assembly 22 may sit atop a top surface 46 of the seat bottom 24 and recline against the seatback 26.

The seat bottom 24 has a front end 48 and a rear end 50. The front end 48 is seat-forward of the rear end 50 in a seat-forward direction SF. The seat bottom 24 can include a frame 52. The frame 52 may include tubes, beams, etc. Specifically, the frame 52 may include a pair of frame members elongated in the seat-forward direction SF, e.g., between the front end 48 and the rear end 50 of the seat bottom 24. The frame members are spaced from each other along lateral axis A1. The frame 52 may include cross-members extending between the frame members. The cross-members may be elongated along the lateral axis A1. The frame 52 can include a seat pan. The seat pan may be generally planar and extend from one of the frame members to the other of the frame members, e.g., along lateral axis A1. The seat pan may be fixed to the frame members. The frame 52, including the frame members, the cross-members, and the seat pan may be of any suitable plastic material, e.g., carbon fiber reinforced plastic (CFRP), glass fiber-reinforced semi-finished thermoplastic composite (organosheet), etc. As another example, some or all components of the frame 52 may be formed of a suitable metal, e.g., steel, aluminum, etc. The seat bottom 24 can include a covering. The covering may include upholstery and padding. The upholstery may be cloth, leather, faux leather, or any other suitable material. The upholstery may be stitched in panels around the frame 52. The padding may be between the upholstery and the frame. The padding may be foam or any other suitable material.

The seatback 26 may include a seatback frame 54 and a cover supported on the seatback frame 54. The seatback frame 54 may include tubes, beams, etc. Specifically, the seatback frame 54 may include a pair of upright frame members. The upright frame members are elongated, and specifically, are elongated in a generally upright direction (e.g., along a vertical axis A2) when the seatback 26 is in a generally upright position. The upright frame members are spaced from each other along the lateral axis A1 of the seatback 26. The seatback frame 54 may include one or more cross-members extending between the upright frame members. The seatback frame 54, including the upright frame members, may be of any suitable plastic material, e.g., carbon fiber reinforced plastic (CFRP), glass fiber-reinforced semi-finished thermoplastic composite (organosheet), etc. As another example, some or all components of the seatback frame 54 may be formed of a suitable metal, e.g., steel, aluminum, etc. The cover may include upholstery and padding. The upholstery may be cloth, leather, faux leather, or any other suitable material. The upholstery may be stitched in panels around the frame. The padding may be between the cover and the seatback frame 54 and may be foam or any other suitable material.

The seatback 26 has the top end 28 and a bottom end 56. The bottom end 56 is at, e.g., abuts, the seat bottom 24. The top end 28 is spaced from, e.g., distal to, the seat bottom 24. In other words, the top end 28 and the bottom end 56 are opposite ends, with the top end 28 above the bottom end 56 along the vertical axis A2. The seatback 26 includes a first side 58 and a second side 60 spaced from each other along the lateral axis A1 of the seatback 26. The lateral axis A1 is perpendicular to the vertical axis A2. For example, the first side 58 may be at a right of the occupant seated in the seat assembly 22, and the second side 60 may be at a left of the occupant.

The seatback 26 is supported by the seat bottom 24 at the rear end 50. The seat bottom 24 extends from the seatback 26 in the seat-forward direction SF of the seat assembly 22. The rear end 50 is proximate to the seatback 26 and the front end 48 is distal from the seatback 26.

The seatback 26 may be stationary or movable relative to the seat bottom 24. The seatback 26 and the seat bottom 24 may be adjustable in multiple degrees of freedom. Specifically, the seatback 26 and the seat bottom 24 may themselves be adjustable, in other words, adjustable components within the seatback 26 and/or the seat bottom 24, and/or may be adjustable relative to each other.

Figure 2:
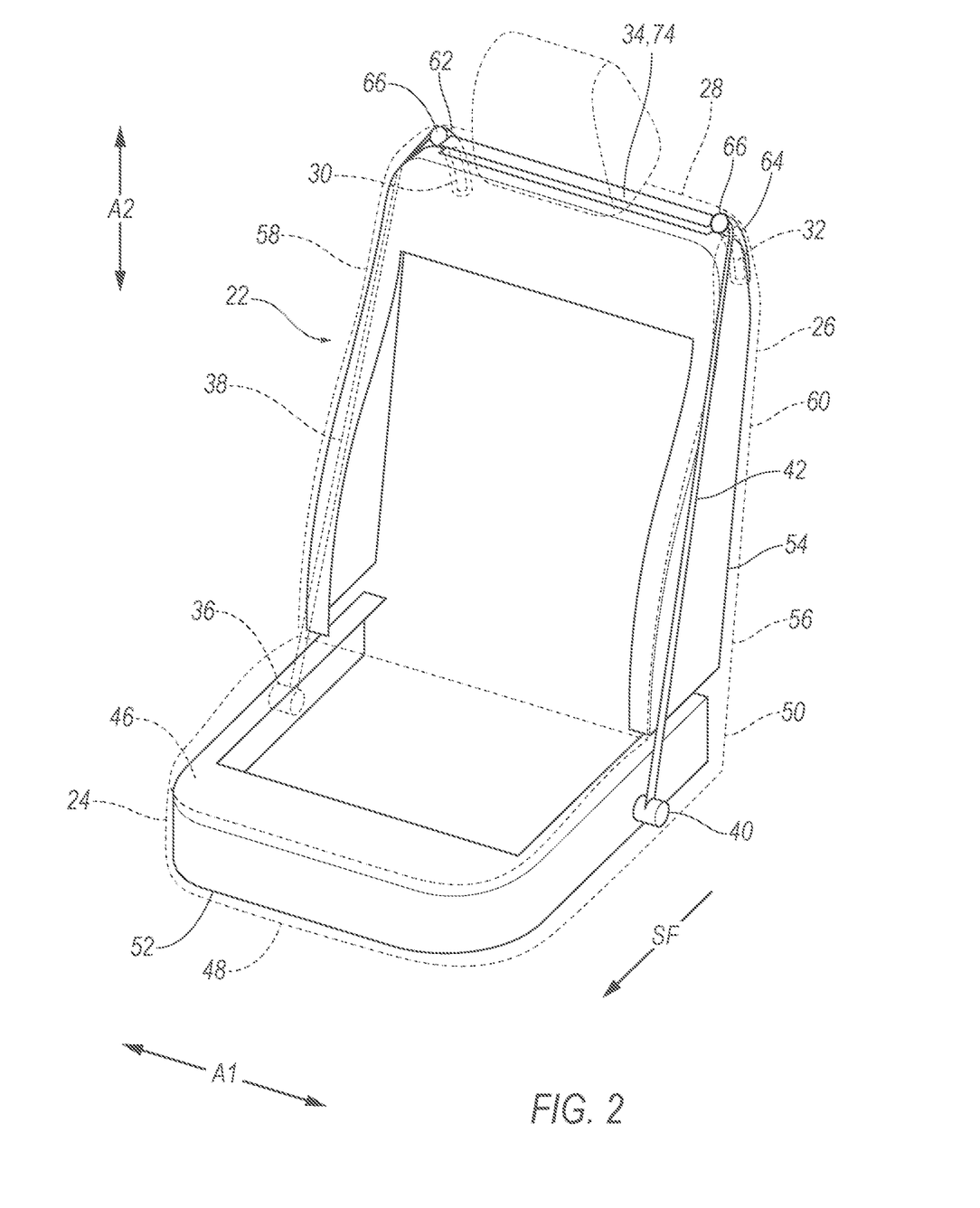
FIG. 2 is a perspective view the seat assembly with an airbag in an uninflated position.
Figure 3:
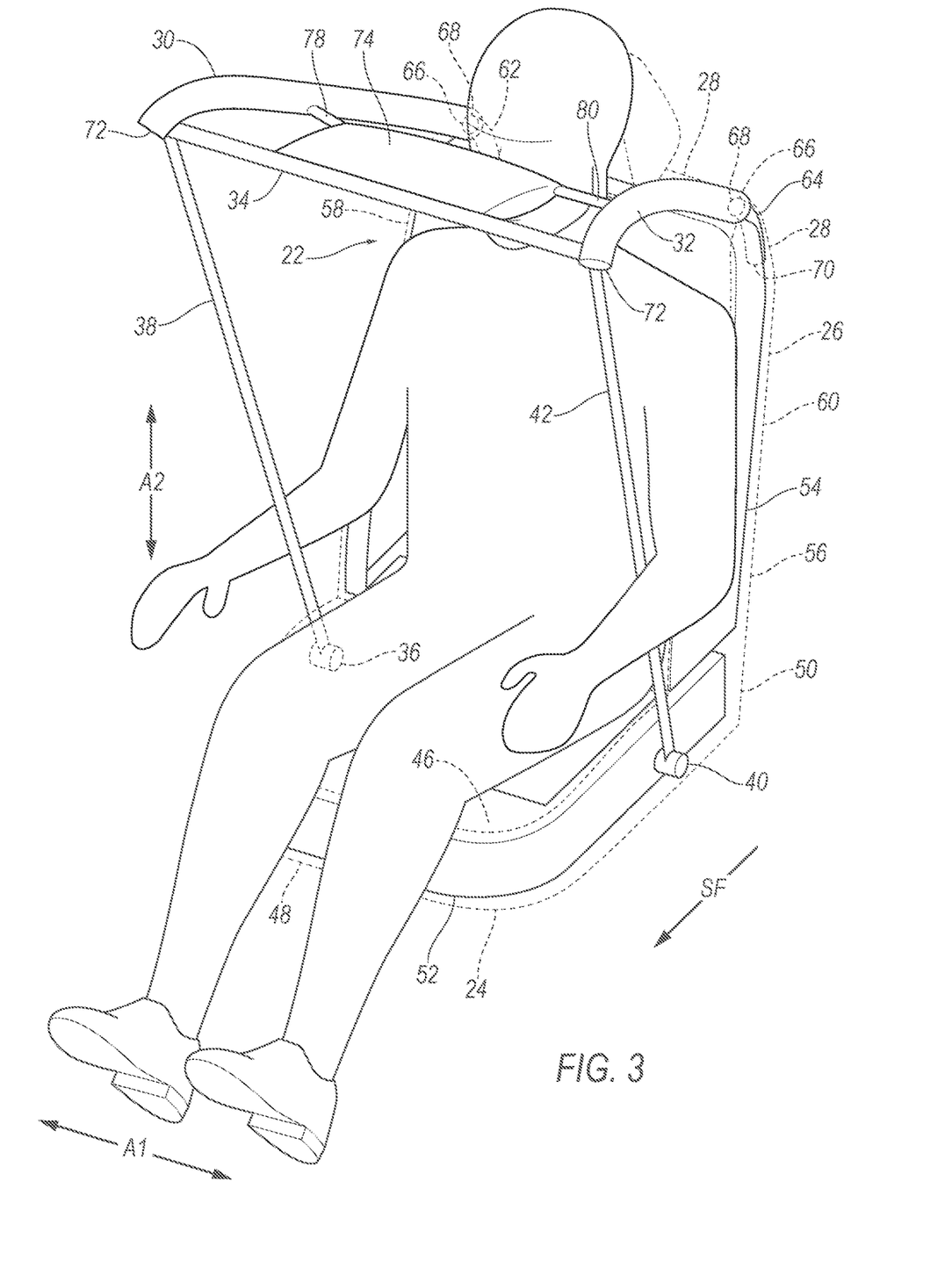
FIG. 3 is a perspective view the seat assembly with the airbag in an inflated and un-retracted position.
Figure 4:
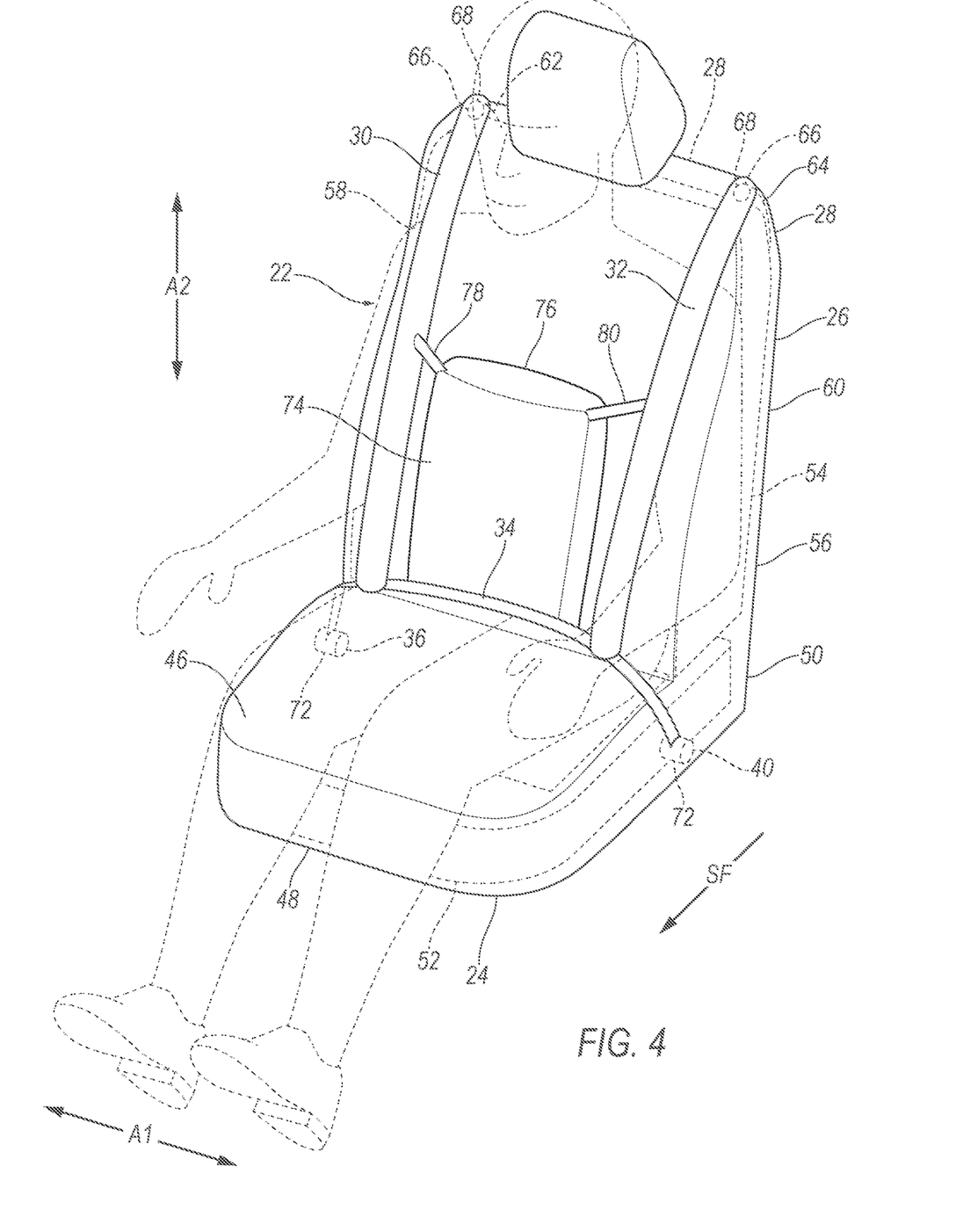
FIG. 4 is a perspective view the seat assembly with the airbag in an inflated and retracted position.

The first airbag 30 and the second airbag 32 are each inflatable from uninflated positions, shown FIGS. 1 and 2, to inflated positions, shown in FIGS. 3 and 4. FIG. 3 shows the airbags 30, 32 at the inflated positions before the retractors 36, 40 are actuated, and FIG. 4 shows the airbags 30, 32 at the inflated positions after the retractors 36, 40 are actuated. The airbags 30, 32 in the inflated positions are tubular, i.e., generally cylindrical. The first airbag 30 and the second airbag 32 may each include panels of a woven polymer, or any other suitable material, that define inflation chambers that can receive inflation medium to inflate the first airbag 30 and the second airbag 32 to the inflated positions. As one example, the first airbag 30 and the second airbag 32 may be formed of woven nylon yarn, for example, nylon 6-6. Other examples include polyether ether ketone (PEEK), polyetherketoneketone (PEKK), polyester, etc. The woven polymer may include a coating, such as silicone, neoprene, urethane, etc. For example, the coating may be polyorgano siloxane.

The first airbag 30 and the second airbag 32 are supported by the seatback 26 at the top end 28. For example, the first airbag 30 and the second airbag 32 may be supported by the seatback frame 54, e.g., via a first chute 62 and a second chute 64, airbag housings, fasteners and/or any other suitable structure. The first airbag 30 and the second airbag 32 are spaced from each other along the lateral axis A1 of the seatback 26. For example, the first airbag 30 may be at the first side 58 of the seatback 26 and the second airbag 32 may be at the second side 60 of the seatback 26.

The first airbag 30 may be supported by the first chute 62 and the second airbag 32 may be supported by the second chute 64. For example, the first airbag 30 in the uninflated position may be disposed within the first chute 62, and the second airbag 32 in the uninflated position may be disposed within the second chute 64. The first chute 62 and the second chute 64 may be supported by the seatback 26 at the top end 28, e.g., fixed to the seatback frame 54 via weld, fastener, or other suitable structure. The first chute 62 and the second chute 64 are spaced from each other along the lateral axis A1 of the seatback 26. For example, the first chute 62 may be at the first side 58 of the seatback 26 and the second chute 64 may be at the second side 60 of the seatback 26.

The first chute 62 and the second chute 64 direct inflation of the first airbag 30 and the second airbag 32. The first chute 62 and the second chute 64 are pointed seat-upward and seat-forward to direct inflation of the first airbag 30 and the second airbag 32 upward and forward from the seatback 26, e.g., above a head of the occupant of the seat assembly 22 and as shown in FIG. 3. The first chute 62 and the second chute 64 may each have an open end 66 that faces upward and forward. For example, the first chute 62 and the second chute 64 may each be elongated between first ends 68 and second ends 70. The first ends 68 may be forward of the second ends 70, e.g., along the seat-forward direction SF while the seatback 26 is at the upright position. The first ends 68 may be above the second ends 70, e.g., along the vertical axis A2 of the seatback 26. The first ends 68 of the first chute 62 and the second chute 64 may be open. The first airbag 30 in the inflated position may extend from within the first chute 62 away from the second end 70 and out through the open first end 66, 68.

Likewise, the second airbag 32 in the inflated position may extend from within the second chute 64 away from the second end 70 and out through the open first end 66, 68. The first airbag 30 and the second airbag 32 in inflated positions may extend away from the first chute 62 and the second chute 64 to respective distal ends 72. The first chute 62 and the second chute 64 may be hollow and generally cylindrical, or any suitable shape. The first chute 62 and the second chute 64 may be any suitable material, e.g., a rigid polymer, a metal, a composite, etc.

The lap belt 34 extends from the first airbag 30 to the second airbag 32, e.g., along the lateral axis A1 of the seatback 26. The lap belt 34 may extend from the distal end 72 of the first airbag 30 to the distal end 72 of the second airbag 32. The lap belt 34 may be fixed to the first airbag 30 and/or the second airbag 32, e.g., via stitching or other suitable structure. The lap belt 34 may be at the top end 28 of the seatback 26 with the first airbag 30 and the second airbag 32 at the uninflated positions. The lap belt 34 may be spaced from the seatback 26 in the seat-forward direction SF with the first airbag 30 and the second airbag 32 at the inflated positions. The lap belt 34 may be woven polymer, or any suitable material.

The seat assembly 22 may include a chest panel 74 for controlling kinematics of the occupant of the seat. The chest panel 74 may be between the first airbag 30 and the second panel along the lateral axis A1 of the seatback 26. The chest panel 74 may be at the top end 28 of the seatback 26 with the first airbag 30 and the second airbag 32 at the uninflated positions. The lap belt 34 may be spaced from the seatback 26 in the seat-forward direction SF with the first airbag 30 and the second airbag 32 at the inflated positions. With reference to FIG. 4, the chest panel 74 may be above the lap belt 34 along the vertical axis A2 when the first airbag 30 and the second airbag 32 are in the inflated positions after the retractors 36, 40 are actuated. The chest panel 74 may include a top edge 76 positioned to be below the head of the occupant seated on the seat bottom 24. In other words, the chest panel 74 may be between the head and a waist of the occupant, e.g., to control kinematics of a chest of the occupant during certain vehicle impacts. The chest panel 74 may be a woven polymer, or any suitable material. A test dummy that conforms to a certain standard, such as a 50th Percentile Adult Male Hybrid III test dummy, may be used as the occupant when determining that the top edge 76 is positioned below the head of the occupant seated on the seat bottom 24.

The chest panel 74 may be inflatable. In other words, the chest panel 74 may define an inflation chamber that receives inflation medium and expands the chest panel 74 from an uninflated position to an inflated position. For example, the chest panel 74 may include one or more sheets of material that enclose the inflation chamber of the chest panel 74.

The chest panel 74 may be supported by the first airbag 30 and the second airbag 32. For example, a first chest tether 78 may extend from the first airbag 30 to the chest panel 74 and a second chest tether 80 may extend from the second airbag 32 to the chest panel 74. The first chest tether 78 may be fixed to the first airbag 30 and the chest panel 74, e.g., via stitching, adhesive, friction weld, or any suitable structure. Similarly, the second chest tether 80 may be fixed to the second airbag 32 and the chest panel 74. The first chest tether 78 and the second chest tether 80 may be inflatable. In other words, first chest tether 78 and the second chest tether 80 may define an inflation chamber that receives inflation medium and expands from an uninflated position to an inflated position. The first chest tether 78 and the second chest tether 80 may include tubular webbing. The tubular webbing may be generally flat in cross section in the uninflated position and generally circular in cross section in the inflated position. The tubular webbing surrounds the inflation chamber therein. The inflation chambers may be continuous along the first chest tether 78 and the second chest tether 80. The first chest tether 78 and the second chest tether 80 may be include fluid communication with the chest panel 74 and the respective first airbag 30 and second airbag 32 back. For example, inflation medium may flow from the inflation chamber of the first airbag 30 to the inflation chamber of the first chest tether 78, and from the inflation chamber of the first chest tether 78 to the inflation chamber of the chest panel 74. Similarly, inflation medium may flow from the inflation chamber of the second airbag 32 to the inflation chamber of the second chest tether 80, and from the inflation chamber of the second chest tether 80 to the inflation chamber of the chest panel 74.

The first retractor 36 and the second retractor 40 are actuatable to draw the lap belt 34 toward the seat bottom 24, e.g., in response to a command from a computer 82. The first tether 38 may be retractable by and extend from the first retractor 36 to the lap belt 34. The first tether 38 may be fixed to the lap belt 34, e.g., via stitching, weave, or other suitable structure. The second tether 42 may be retractable by and extend from the second retractor 40 to the lap belt 34. The second tether 42 may be fixed to the lap belt 34. The lap belt 34, the first tether 38, and/or the second tether 42 may be unitary. Unitary means a single, uniform piece of material with no seams, joints, fasteners, or adhesives holding it together, i.e., formed together simultaneously as a single continuous unit, e.g., by forming with a continuous weave, etc. Non-unitary components, in contrast, are formed separately and subsequently assembled, e.g., by threaded engagement, welding, stitching, etc. The first retractor 36 and the second retractor 40 are actuatable to retract the first tether 38 and the second tether 42. In other words, the first retractor 36 and the second retractor 40 are actuatable to reduce a length of the first tether 38 and the second tether 42 between the lap belt 34 and the first retractor 36 and the second retractor 40.

The first retractor 36 and the second retractor 40 may each include a pyrotechnic charge that is activated to actuate the respective first retractor 36 and/or second retractor 40. The first retractor 36 and the second retractor 40 may each include, for example, a rotary actuator or a linear actuator. In examples where first retractor 36 and the second retractor 40 may include the rotary actuator, the pyrotechnic charge rotates a shaft connected to the first tether 38 or the second tether 42 such that the first tether 38 or the second tether 42 winds around the shaft. In other examples, the first retractor 36 and the second retractor 40 may include a piston linkage; a ball-in-tube linkage, or any other suitable type. The first retractor 36 and the second retractor 40 may include any other suitable structure, e.g., springs, solenoids, etc., for retracting the first tether 38 or the second tether 42.

The first retractor 36 and the second retractor 40 may be supported by the seat bottom 24. For example, the first retractor 36 and the second retractor 40 may be fixed to the frame 52 of the seat bottom 24 via fasteners or any suitable structure. The first retractor 36 and the second retractor 40 may be spaced from each other along the lateral axis A1 of the seatback 26. For example, the first retractor 36 may be proximate the first side 58 of the seatback 26 and the second retractor 40 may be proximate the second side 60 of the seatback 26. The first retractor 36 and the second retractor 40 may be spaced from the seatback 26. For example, the first retractor 36 and the second retractor 40 may be seat-forward of the seatback 26. In other words, the first retractor 36 and the second retractor 40 may be forward of the seatback 26 in the seat-forward direction SF.

Figure 5:
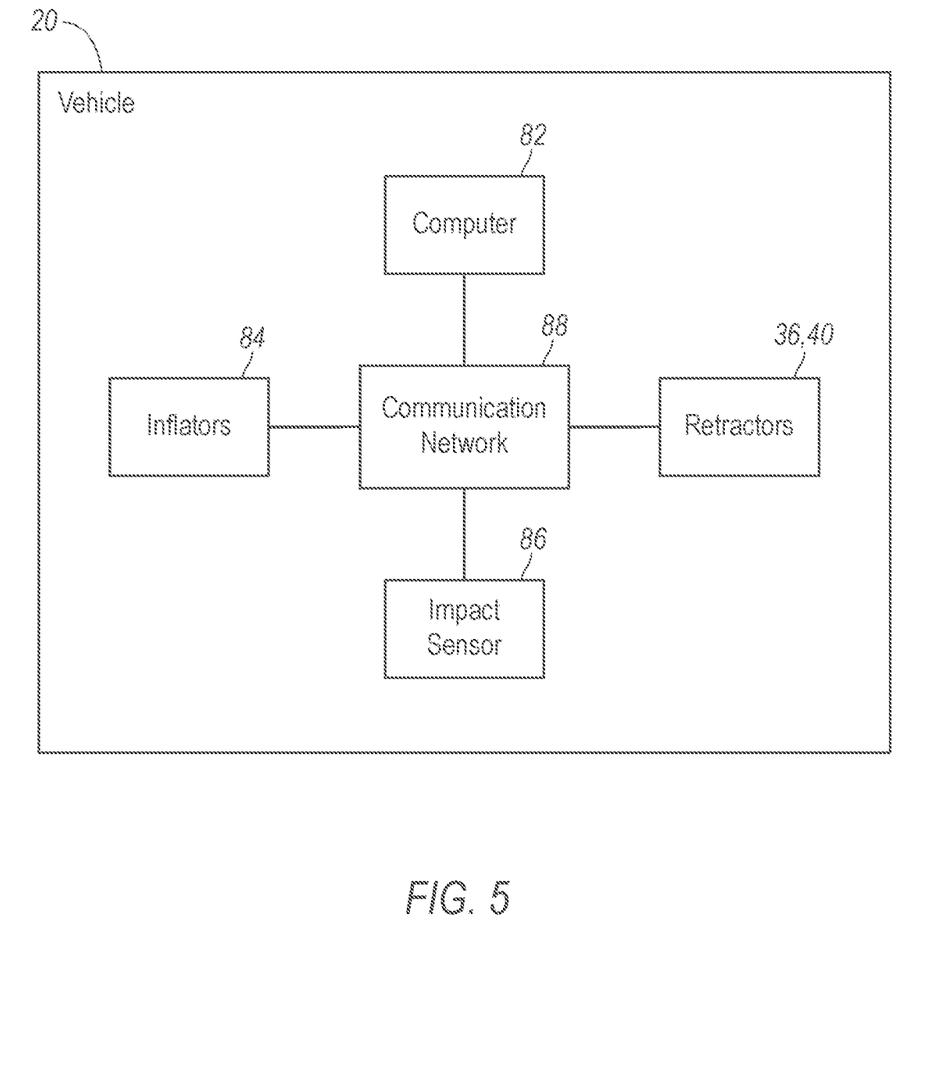
FIG. 5 is a block diagram of components of the vehicle.

With reference to FIG. 5, the seat assembly 22 may include one or more inflators 84 for inflating the first airbag 30 and the second airbag 32 to the inflated positions. The inflators 84 provide inflation medium to inflate the first airbag 30 and the second airbag 32 from uninflated positions to the inflated positions. Each inflator 84 may be, for example, a pyrotechnic inflator that uses a chemical reaction to drive inflation medium to the first airbag 30 and/or the second airbag 32. The inflators 84 may be of any suitable type, for example, a cold-gas inflator. Each inflator 84 may be in fluid communication with one or more of the first airbag 30 and/or the second airbag 32, e.g., directly, through various piping, etc. For example, one inflator 84 may provide inflation medium to the first airbag 30 another inflator 84 may provide inflation medium to the second airbag 32. The inflators 84 may be supported by the first chute 62, the second chute 64, or by any other suitable structure of the seat assembly 22. For example, the inflators 84 may be within the first chute 62 and the second chute 64 at the second ends 70.

The vehicle 20 may include at least one impact sensor 86 configured to detect certain impacts to the vehicle 20, i.e., of a certain type and/or magnitude. The impact sensor 86 may be configured to detect certain impact contemporaneously with the certain impact and/or the impact sensor 86 may be configured to sense certain impacts prior to impact, i.e., pre-impact sensing. The impact sensor 86 may be of any suitable type, for example, post contact sensors such as accelerometers, pressure sensors, and contact switches; and pre-impact sensors such as radar, LIDAR, and vision sensing systems. The vision systems may include one or more cameras, CCD image sensors, CMOS image sensors, etc. The impact sensor 86 may be located at numerous points in or on the vehicle 20.

The vehicle 20 may include a communication network 88. The communication network 88 includes hardware, such as a communication bus, for facilitating communication among vehicle 20 components, e.g., the computer 82, the impact sensor 86, the inflators 84, etc. The communication network 88 may facilitate wired or wireless communication among the vehicle 20 components in accordance with a number of communication protocols such as controller area network (CAN), Ethernet, WiFi, Local Interconnect Network (LIN), and/or other wired or wireless mechanisms. Alternatively or additionally, in cases where the computer 82 comprises a plurality of devices, the communication network 88 may be used for communications between devices represented as the computer 82 in this disclosure.

The computer 82 may be a microprocessor-based computer implemented via circuits, chips, or other electronic components. The computer 82 includes a processor, a memory, etc. The memory of the computer 82 may include memory for storing programming instructions executable by the processor as well as for electronically storing data and/or databases. For example, the computer 82 can be a generic computer with a processor and memory as described above and/or may include an electronic control unit (ECU) or controller for a specific function or set of functions, and/or a dedicated electronic circuit including an ASIC that is manufactured for a particular operation, e.g., an ASIC for processing sensor data and/or communicating the sensor data. As another example, the computer 82 may be a restraints control module. In another example, computer 82 may include an FPGA (Field-Programmable Gate Array) which is an integrated circuit manufactured to be configurable by a user. Typically, a hardware description language such as VHDL (Very High-Speed Integrated Circuit Hardware Description Language) is used in electronic design automation to describe digital and mixed-signal systems such as FPGA and ASIC. For example, an ASIC is manufactured on VHDL programming provided pre-manufacturing, whereas logical components inside an FPGA may be configured based on VHDL programming, e.g., stored in a memory electrically connected to the FPGA circuit. In some examples, a combination of processor(s), ASIC(s), and/or FPGA circuits may be included in the computer. The memory can be of any type, e.g., hard disk drives, solid state drives, servers, or any volatile or non-volatile media. The memory can store the collected data sent from the sensors.

The computer 82 is programmed to, i.e., the memory stories instructions executable by the processor to, command inflation of the first airbag 30 and the second airbag 32. The computer 82 may command inflation of the inflation of the first airbag 30 and the second airbag 32 by transmitting a command to the inflators 84 to trigger release of inflation medium to the first airbag 30 and the second airbag 32. The command may include, for example, an electrical signal, such as a pulse, transmitted to the inflators 84 via the communication network 88.

The computer 82 is programmed to command actuation of the first retractor 36 and the second retractor 40. The computer 82 may command actuation of the first retractor 36 and the second retractor 40 by transmitting a command to the first retractor 36 and the second retractor 40 to trigger detonation a pyrotechnic charge of the first retractor 36 and the second retractor 40, to trigger actuation of a solenoid of the first retractor 36 and the second retractor 40, etc. The command may include, for example, an electrical signal transmitted to the first retractor 36 and the second retractor 40 via the communication network 88.

The computer 82 is programmed to command actuation of the first retractor 36 and the second retractor 40 a predetermined amount of time after commanding inflation of the first airbag 30 and the second airbag 32. The predetermined amount of time is sufficiently long enough to permit inflation of the first airbag 30 and the second airbag 32 up and over the head of the occupant before commanding the actuation of the first retractor 36 and the second retractor 40, as shown in FIG. 3. The predetermined amount of time is sufficiently short enough to permit retraction of the first retractor 36 and the second retractor 40 to draw the lap belt 34 down prior to the occupant moving away from the seatback 26. The predetermined amount of time may be predetermined and stored in the memory of the computer 82. The predetermined amount of time may be determined with real world and/or computer 82 simulated testing, including vehicle 20 crash testing. The predetermined amount of time may be, for example, 3 to 15 milliseconds (ms). FIG. 4 shows the first airbag 30 and the second airbag 32 after the computer 32 commands actuation of the first retractor 36 and the second retractor 40 and the lap belt 34 is drawn down over a lap off the occupant.

Computing devices, such as the computer, generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

The adjectives first, second, etc., are used throughout this document as identifiers and, unless explicitly stated otherwise, are not intended to signify importance, order, or quantity.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The invention claimed is:

1. An assembly, comprising:
 a seat bottom;
 a seatback supported by the seat bottom, the seatback having a top end;
 a first airbag inflatable to an inflated position and supported by the seatback at the top end;
 a second airbag inflatable to an inflated position supported by the seatback at the top end, the second airbag spaced from the first airbag along a lateral axis of the seatback;
 a lap belt extending from the first airbag to the second airbag;
 a first retractor supported by the seat bottom and spaced from the seatback;
 a first tether extending from the first retractor and fixed to the lap belt;
 a second retractor supported by the seat bottom and spaced from the seatback, the second retractor spaced from the first retractor along the lateral axis; and
 a second tether extending from the second retractor and fixed to the lap belt.

2. The assembly of claim 1, wherein the first retractor and the second retractor are seat-forward of the seatback.

3. The assembly of claim 1, further comprising a first chute and a second chute supported by the seat back and pointed upward and forward to direct inflation of the first airbag and the second airbag.

4. The assembly of claim 3, wherein the first chute and the second chute each have an open end that faces upward and forward.

5. The assembly of claim 1, further comprising a chest panel supported above the lap belt by the first airbag and the second airbag in the inflated positions.

6. The assembly of claim 5, wherein the chest panel is inflatable.

7. The assembly of claim 5, wherein the chest panel includes a top edge positioned to be below a head of an occupant seated on the seat bottom with the first airbag and the second airbag in the inflated positions.

8. The assembly of claim 5, further comprising a first chest tether extending from the first airbag to the chest panel and a second chest tether extending from the second airbag to the chest panel.

9. The assembly of claim 1, wherein the first retractor and the second retractor are actuatable to retract the first tether and the second tether.

10. The assembly of claim 9, further comprising a computer having a processor and a memory storing instructions executable by the processor to command inflation of the first airbag and the second airbag, and command actuation of the first retractor and the second retractor.

11. The assembly of claim 10, wherein the instructions include instructions to command actuation of the first retractor and the second retractor a predetermined amount of time after commanding inflation of the first airbag and the second airbag.

12. An assembly, comprising:
a seat bottom having a front end and a rear end;
a seatback supported by the seat bottom at the rear end, the seatback having a top end spaced from the seat bottom;
a first chute supported by the seatback at the top end;
a first airbag supported by the first chute and inflatable to an inflated position, the first chute pointed seat-upward and seat-forward to direct inflation of the first airbag;
a second chute supported by the seatback at the top end, the second chute spaced from the first chute along a lateral axis of the seatback;
a second airbag supported by the second chute and inflatable to an inflated position, the second chute pointed seat-upward and seat-forward to direct inflation of the second airbag;
a lap belt extending from the first airbag to the second airbag;
a first retractor;
a first tether extending from the first retractor and fixed to the lap belt;
a second retractor spaced from the first retractor along the lateral axis; and
a second tether extending from the second retractor and fixed to the lap belt.

13. The assembly of claim 12, wherein the first chute and the second chute are each elongated between first ends and second ends, the first ends forward and above the second ends.

14. The assembly of claim 13, wherein the first ends of the first chute and the second chute are open.

15. The assembly of claim 12, further comprising a chest panel supported above the lap belt by the first airbag and the second airbag in the inflated positions.

16. The assembly of claim 15, wherein the chest panel is inflatable.

17. The assembly of claim 15, wherein the chest panel includes a top edge positioned to be below a head of an occupant seated on the seat bottom with the first airbag and the second airbag in the inflated positions.

18. The assembly of claim 12, wherein the first retractor and the second retractor are actuatable to retract the first tether and the second tether.

19. The assembly of claim 18, further comprising a computer having a processor and a memory storing instructions executable by the processor to command inflation of the first airbag and the second airbag, and command actuation of the first retractor and the second retractor.

20. The assembly of claim 19, wherein the instructions include instructions to command actuation of the first retractor and the second retractor a predetermined amount of time after commanding inflation of the first airbag and the second airbag.

* * * * *